(12) United States Patent
Takano et al.

(10) Patent No.: US 12,032,779 B2
(45) Date of Patent: Jul. 9, 2024

(54) DETECTION DEVICE AND DISPLAY DEVICE

(71) Applicant: Japan Display Inc., Tokyo (JP)

(72) Inventors: Daijiro Takano, Tokyo (JP); Mitsuhiro Sugawara, Tokyo (JP)

(73) Assignee: Japan Display Inc., Tokyo (JP)

( * ) Notice: Subject to any disclaimer, the term of this patent is extended or adjusted under 35 U.S.C. 154(b) by 33 days.

(21) Appl. No.: 17/875,653

(22) Filed: Jul. 28, 2022

(65) Prior Publication Data

US 2023/0033119 A1 Feb. 2, 2023

(30) Foreign Application Priority Data

Jul. 30, 2021 (JP) .................. 2021-125621
Dec. 9, 2021 (JP) .................. 2021-200260

(51) Int. Cl.
  *G06F 3/041* (2006.01)
  *G06F 3/042* (2006.01)
  *G06V 40/13* (2022.01)
  *G06V 40/40* (2022.01)

(52) U.S. Cl.
  CPC ........ *G06F 3/04166* (2019.05); *G06F 3/0412* (2013.01); *G06F 3/0421* (2013.01); *G06V 40/1318* (2022.01); *G06F 2203/04108* (2013.01); *G06V 40/45* (2022.01)

(58) Field of Classification Search
  CPC .. G06F 3/04166; G06F 3/0412; G06F 3/0421; G06F 2203/04108; G06V 40/1318; G06V 40/45
  See application file for complete search history.

(56) References Cited

U.S. PATENT DOCUMENTS

| 2017/0220182 A1* | 8/2017 | Schwartz | G06F 3/0412 |
| 2018/0210603 A1* | 7/2018 | Won | G06F 3/0446 |
| 2022/0317852 A1* | 10/2022 | Park | G06F 3/04166 |

FOREIGN PATENT DOCUMENTS

JP 2009-181085 A 8/2009

* cited by examiner

*Primary Examiner* — Peter D McLoone
(74) *Attorney, Agent, or Firm* — K&L Gates LLP

(57) ABSTRACT

A detection device includes a sensor circuit in which a plurality of detection elements each comprising a photoelectric conversion element are arranged in a matrix having a row-column configuration in a detection area, and a detector having a touch detection period of detecting an object to be detected in contact with or in proximity to the sensor circuit and a fingerprint detection period of detecting asperities on a surface of the object to be detected.

24 Claims, 15 Drawing Sheets

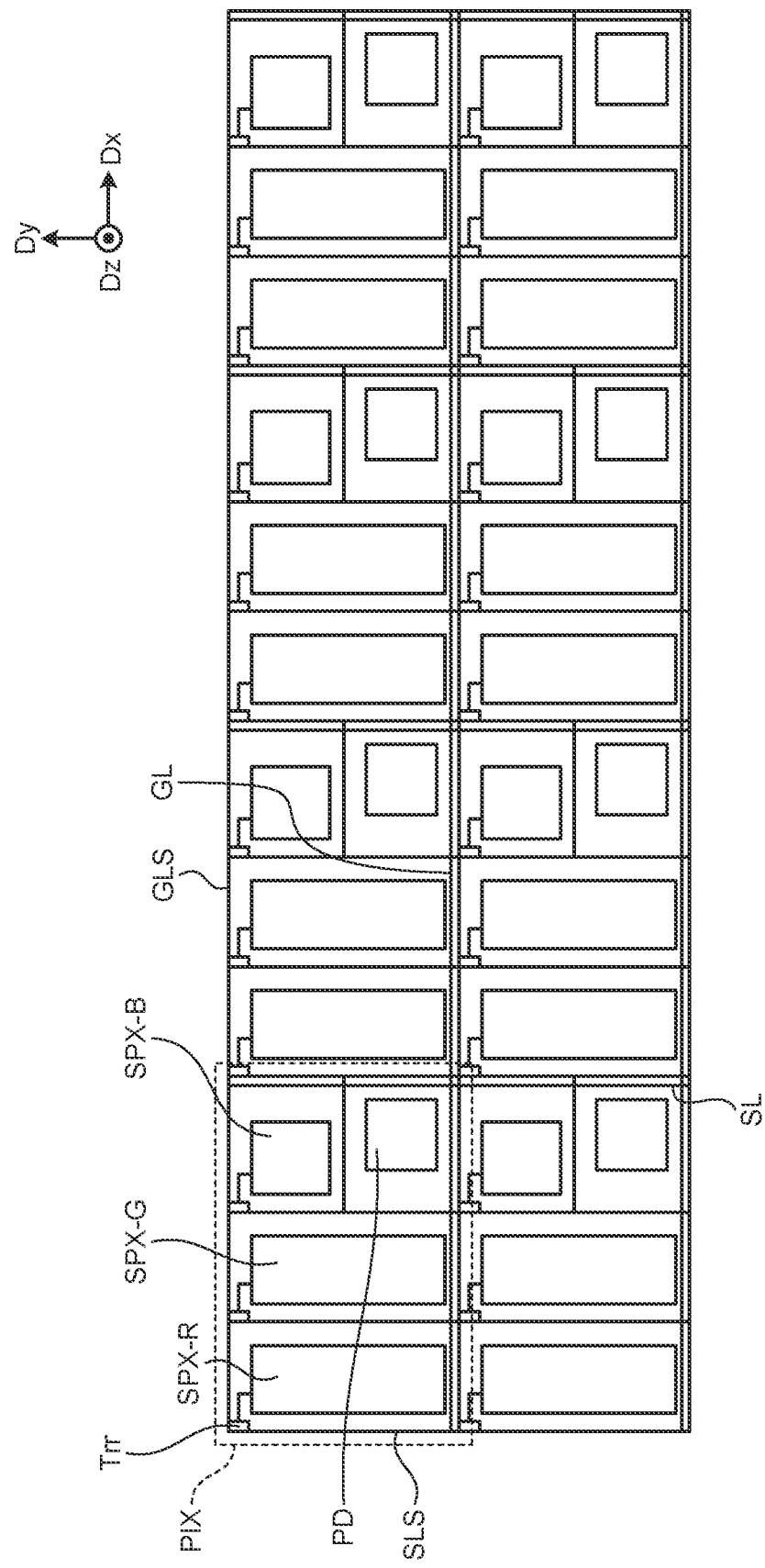

DETECTION DEVICE AND DISPLAY DEVICE

CROSS-REFERENCE TO RELATED APPLICATION

This application claims the benefit of priority from Japanese Patent Application No. 2021-125621 filed on Jul. 30, 2021 and Japanese Patent Application No. 2021-200260 filed on Dec. 9, 2021, the entire contents of which are incorporated herein by reference.

BACKGROUND

1. Technical Field

The present disclosure relates to a detection device and a display device.

2. Description of the Related Art

In recent years, optical sensors have been known as sensors used, for example, for personal authentication. An optical sensor includes a plurality of light-receiving elements such as photodiodes that are arranged on a substrate and output signals that change according to an amount of light received. For example, a display device is disclosed that incorporates an optical sensor in a display panel, and has an optical touch sensor function (Japanese Patent Application Laid-open Publication No. 2009-181085, for example).

For example, if the display panel incorporates both a capacitive sensor for touch detection and an optical sensor for detecting biological information (fingerprint) for, for example, the personal authentication, the number of pieces of wiring provided in a display area increases, which may lead to reduction in transmittance and reduction in manufacturing yield of the panel.

It is an object of the present disclosure to provide a detection device and a display device capable of restraining the reduction in transmittance and the reduction in manufacturing yield.

SUMMARY

A detection device according to an embodiment of the present disclosure includes a sensor circuit in which a plurality of detection elements each comprising a photoelectric conversion element are arranged in a matrix having a row-column configuration in a detection area, and a detector having a touch detection period of detecting an object to be detected in contact with or in proximity to the sensor circuit and a fingerprint detection period of detecting asperities on a surface of the object to be detected. The detector is configured to perform detection in the touch detection period using the detection elements arranged at a first detection pitch among the detection elements included in the detection area, and perform the detection in the fingerprint detection period using the detection elements arranged at a second detection pitch smaller than the first detection pitch among the detection elements included in the detection area.

A display device according to an embodiment of the present disclosure includes a sensor circuit in which a plurality of detection elements each comprising a photoelectric conversion element are arranged in a matrix having a row-column configuration in a detection area, and a detector having a touch detection period of detecting an object to be detected in contact with or in proximity to the sensor circuit and a fingerprint detection period of detecting asperities on a surface of the object to be detected. The detector is configured to perform detection in the touch detection period using the detection elements arranged at a first detection pitch among the detection elements included in the detection area, and perform the detection in the fingerprint detection period using the detection elements arranged at a second detection pitch smaller than the first detection pitch among the detection elements included in the detection area.

BRIEF DESCRIPTION OF THE DRAWINGS

FIG. 18 is a plan view schematically illustrating an arrangement relation between pixels in a display area and light-receiving elements in a detection area of the display device according to the third embodiment.

DETAILED DESCRIPTION

Figure 1:
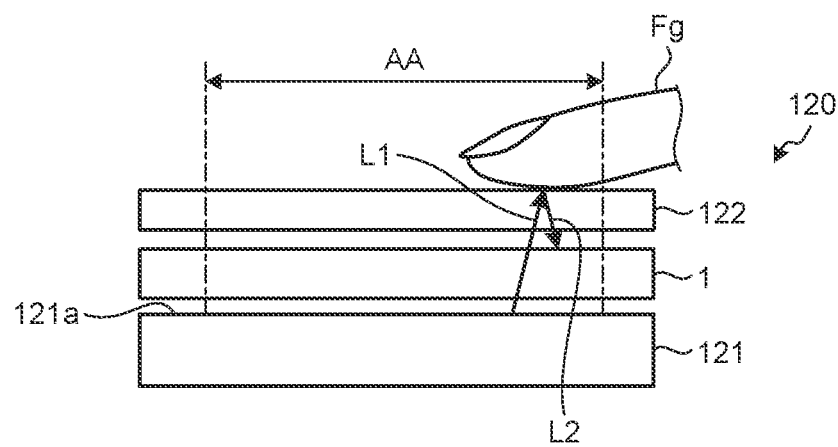
FIG. 1 is a sectional view illustrating a schematic sectional configuration of a detection apparatus having an illumination device, the detection apparatus including a detection device according to an embodiment of the present disclosure.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

FIG. 1 is a sectional view illustrating a schematic sectional configuration of a detection apparatus having an illumination device, the detection apparatus including a detection device according to an embodiment of the present disclosure. As illustrated in FIG. 1, a detection apparatus 120 having an illumination device includes a detection device 1, an illumination device 121, and a cover glass 122. The illumination device 121, the detection device 1, and the cover glass 122 are stacked in this order in a direction orthogonal to a surface of the detection device 1. In the present disclosure, the detection device 1 is an optical sensor that detects a finger Fg according to an amount of light received.

The illumination device 121 has a light-emitting surface 121a for emitting light, and emits light L1 from the light-emitting surface 121a toward the detection device 1. The illumination device 121 is a backlight. The illumination device 121 may be, for example, what is called a side light-type backlight that includes a light guide plate provided in a position corresponding to a detection area AA and a plurality of light sources arranged at one end or both ends of the light guide plate. For example, light-emitting diodes (LEDs) for emitting light in a predetermined color are used as the light sources. The illumination device 121 may be what is called a direct-type backlight that includes the light sources (such as the LEDs) provided directly below the detection area AA. The illumination device 121 is not limited to the backlight, and may be provided on a lateral side or an upper side of the detection device 1, and may emit the light L1 from the lateral side or the upper side of the finger Fg.

The detection device 1 is provided so as to face the light-emitting surface 121a of the illumination device 121. The light L1 emitted from the illumination device 121 passes through the detection device 1 and the cover glass 122. The detection device 1 is, for example, a light-reflective biometric sensor, and can detect asperities (such as a fingerprint) on a surface of the finger Fg by detecting light L2 reflected on the surface the finger Fg. Alternatively, the detection device 1 may detect information on a living body by detecting the light L2 reflected inside the finger Fg in addition to detecting the fingerprint. Examples of the information on the living body include a blood vessel image, pulsation, and a pulse wave of, for example, a vein. The color of the light L1 from the illumination device 121 may be varied according to a detection target.

The cover glass 122 is a member for protecting the detection device 1 and the illumination device 121, and covers the detection device 1 and the illumination device 121. The cover glass 122 is, for example, a glass substrate. The cover glass 122 is not limited to a glass substrate, and may be, for example, a resin substrate. The cover glass 122 need not be provided. In this case, the surface of the detection device 1 is provided with a protective layer, and the finger Fg contacts the protective layer of the detection device 1.

The detection apparatus 120 having an illumination device may be provided with a display panel instead of the illumination device 121. The display panel may be, for example, an organic electroluminescent (EL) (organic light-emitting diode (OLED)) display panel or an inorganic EL (micro-LED or mini-LED) display. Alternatively, the display panel may be a liquid crystal display (LCD) panel using liquid crystal elements as display elements or an electrophoretic display (EPD) panel using electrophoretic elements as display elements. Also, in this case, display light emitted from the display panel passes through the detection device 1, and the fingerprint of the finger Fg and the information on the living body can be detected based on the light L2 reflected by the finger Fg.

Figure 2:
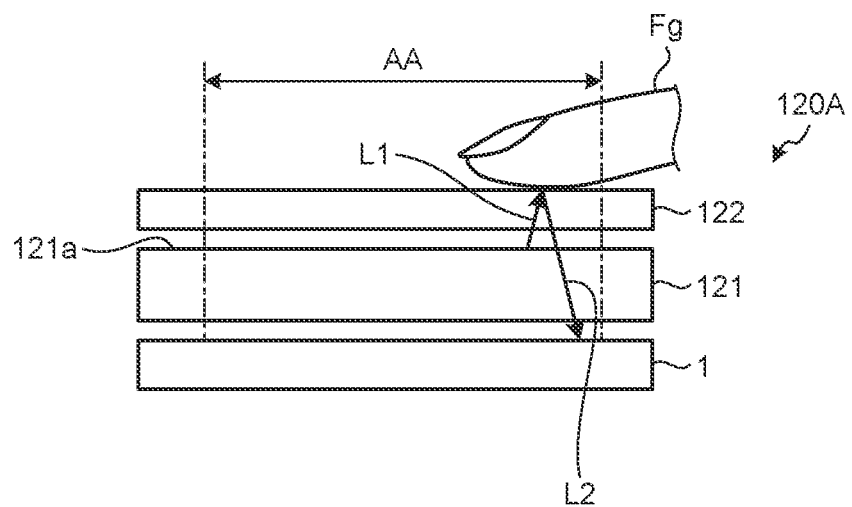
FIG. 2 is a sectional view illustrating a schematic sectional configuration of a detection apparatus having an illumination device according to a modification.

FIG. 2 is a sectional view illustrating a schematic sectional configuration of a detection apparatus having an illumination device according to a modification. As illustrated in FIG. 2, in the detection apparatus 120 having an illumination device, the detection device 1, the illumination device 121, the cover glass 122 are stacked in this order in the direction orthogonal to the surface of the detection device 1. Also, in the present modification, a display panel such as an organic EL display panel can be employed as the illumination device 121.

The light L1 emitted from the illumination device 121 passes through the cover glass 122, and then, is reflected by the finger Fg. The light L2 reflected by the finger Fg passes through the cover glass 122, and further passes through the illumination device 121. The detection device 1 can perform the detection of the information on the living body such as the fingerprint detection by receiving the light L2 that has passed through the illumination device 121.

Figure 3:
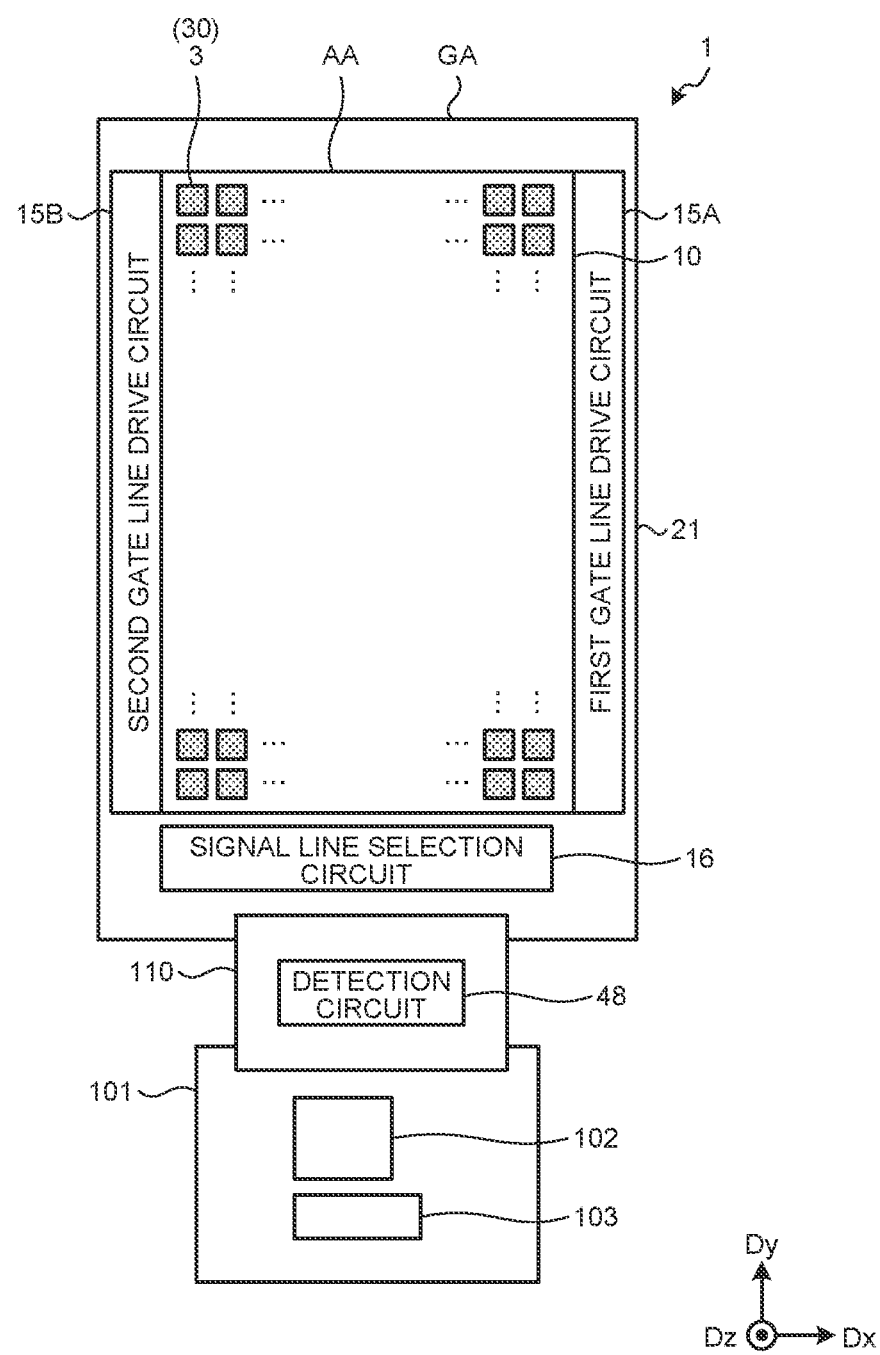
FIG. 3 is a plan view illustrating the detection device according to the embodiment.

FIG. 3 is a plan view illustrating the detection device according to the embodiment. As illustrated in FIG. 3, the detection device 1 includes a substrate 21, a sensor circuit 10, a first gate line drive circuit 15A, a second gate line drive circuit 15B, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor circuit 10, the first gate line drive circuit 15A, the second gate line drive circuit 15B, and the signal line selection circuit 16 to control a detection operation of the sensor circuit 10. The power supply circuit 103 supplies voltage signals including, for example, a power supply potential Vsf and a reference potential Vcom (refer to FIG. 5) to the sensor circuit 10, the first gate line drive circuit 15A, the second gate line drive circuit 15B, and the signal line selection circuit 16.

The substrate 21 has the detection area AA and a peripheral area GA. The detection area AA is an area overlapping a plurality of detection elements 3 included in the sensor circuit 10. The peripheral area GA is an area outside the detection area AA, and is an area not overlapping the detection elements 3. That is, the peripheral area GA is an area between the outer perimeter of the detection area AA and the ends of the substrate 21. The first gate line drive circuit 15A, the second gate line drive circuit 15B, and the signal line selection circuit 16 are provided in the peripheral area GA.

Each of the detection elements 3 of the sensor circuit 10 is a photosensor including a photoelectric conversion element 30. The photoelectric conversion element 30 is a photodiode, and outputs an electrical signal corresponding to light irradiating each of the photoelectric conversion elements 30. More specifically, the photoelectric conversion element 30 is a positive-intrinsic-negative (PIN) photodiode. The detection elements 3 are arranged in a matrix having a row-column configuration in the detection area AA. The photoelectric conversion element 30 included in each of the detection elements 3 performs the detection according to gate drive signals (for example, a reset control signal RST and a read control signal RD) supplied from the first gate line drive circuit 15A and the second gate line drive circuit 15B. Each of the photoelectric conversion elements 30 outputs the electrical signal corresponding to the light irradiating the photoelectric conversion element 30 as a detection signal Vdet to the signal line selection circuit 16. The detection device 1 detects the information on the living body based on the detection signals Vdet received from the detection elements 3.

The first gate line drive circuit 15A, the second gate line drive circuit 15B, and the signal line selection circuit 16 are provided in the peripheral area GA. Specifically, the first gate line drive circuit 15A and the second gate line drive circuit 15B are provided in regions extending along a second direction Dy in the peripheral area GA. The signal line selection circuit 16 is provided in an area extending along a first direction Dx in the peripheral area GA, and is provided between the sensor circuit 10 and the detection circuit 48. The first gate line drive circuit 15A and the second gate line drive circuit 15B are arranged with the detection area AA interposed therebetween in the first direction Dx. The first gate line drive circuit 15A and the second gate line drive circuit 15B are not limited to this configuration, and may be formed as one circuit and arranged along one side of the detection area AA.

The first direction Dx is one direction in a plane parallel to the substrate 21. The second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the substrate 21.

The number of the detection elements 3 arranged in the first direction Dx in the detection area AA is, for example, 1080. The number of the detection elements 3 arranged in the second direction Dy in the detection area AA is, for example, 2340. In this case, 2340 element rows, in each of which 1080 of the detection elements 3 are arranged in the first direction Dx, are arranged in the second direction Dy in the detection area AA. In other words, 1080 element columns, in each of which 2340 of the detection elements 3 are arranged in the second direction Dy, are arranged in the first direction Dx in the detection area AA.

Figure 4:
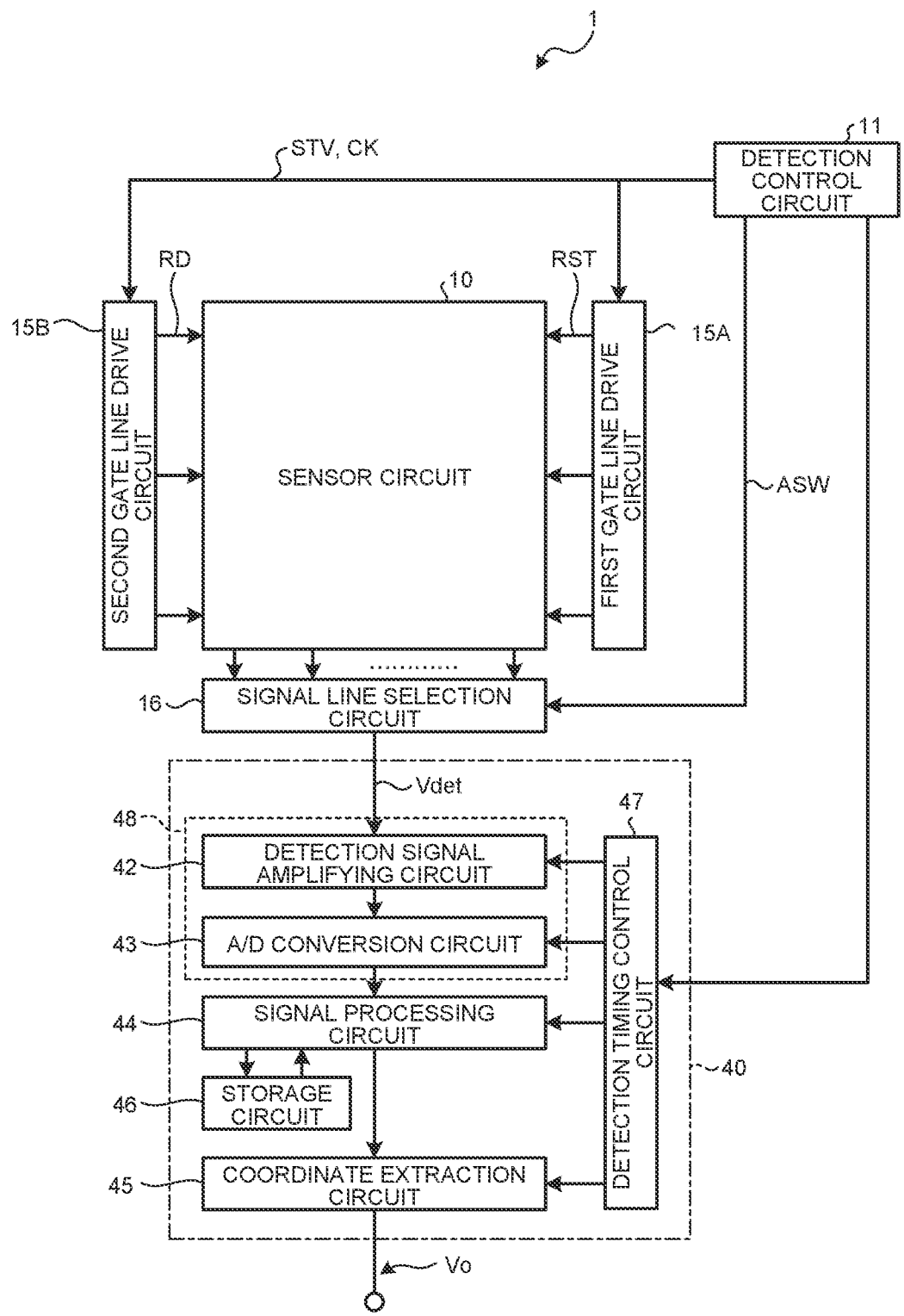
FIG. 4 is a block diagram illustrating a configuration example of the detection device according to the embodiment.

FIG. 4 is a block diagram illustrating a configuration example of the detection device according to the embodiment. As illustrated in FIG. 4, the detection device 1 further includes a detection control circuit 11 and a detector 40 (detection processing circuit). One, some, or all of the functions of the detection control circuit 11 are included in the control circuit 102. One, some or all of the functions of the detector 40 other than those of the detection circuit 48 are also included in the control circuit 102.

The detection control circuit 11 is a circuit that supplies respective control signals to the first gate line drive circuit 15A, the second gate line drive circuit 15B, the signal line selection circuit 16, and the detector 40 to control operations thereof. The detection control circuit 11 supplies various control signals including, for example, a synchronization signal STV and a clock signal CK to the first gate line drive circuit 15A and the second gate line drive circuit 15B. The detection control circuit 11 also supplies various control signals including, for example, a selection signal ASW to the signal line selection circuit 16 during a detection period for performing detection processing.

The first gate line drive circuit 15A and the second gate line drive circuit 15B are circuits that drive a plurality of gate lines (read control scan lines GLrd and reset control scan lines GLrst (refer to FIG. 5)) based on the various control signals. The first gate line drive circuit 15A and the second gate line drive circuit 15B sequentially or simultaneously select the gate lines, and supply the gate drive signals (for example, the reset control signals RST and the read control signals RD) to the selected gate lines. Through this operation, the first gate line drive circuit 15A and the second gate line drive circuit 15B select the photoelectric conversion elements 30 coupled to the gate lines.

Figure 5:
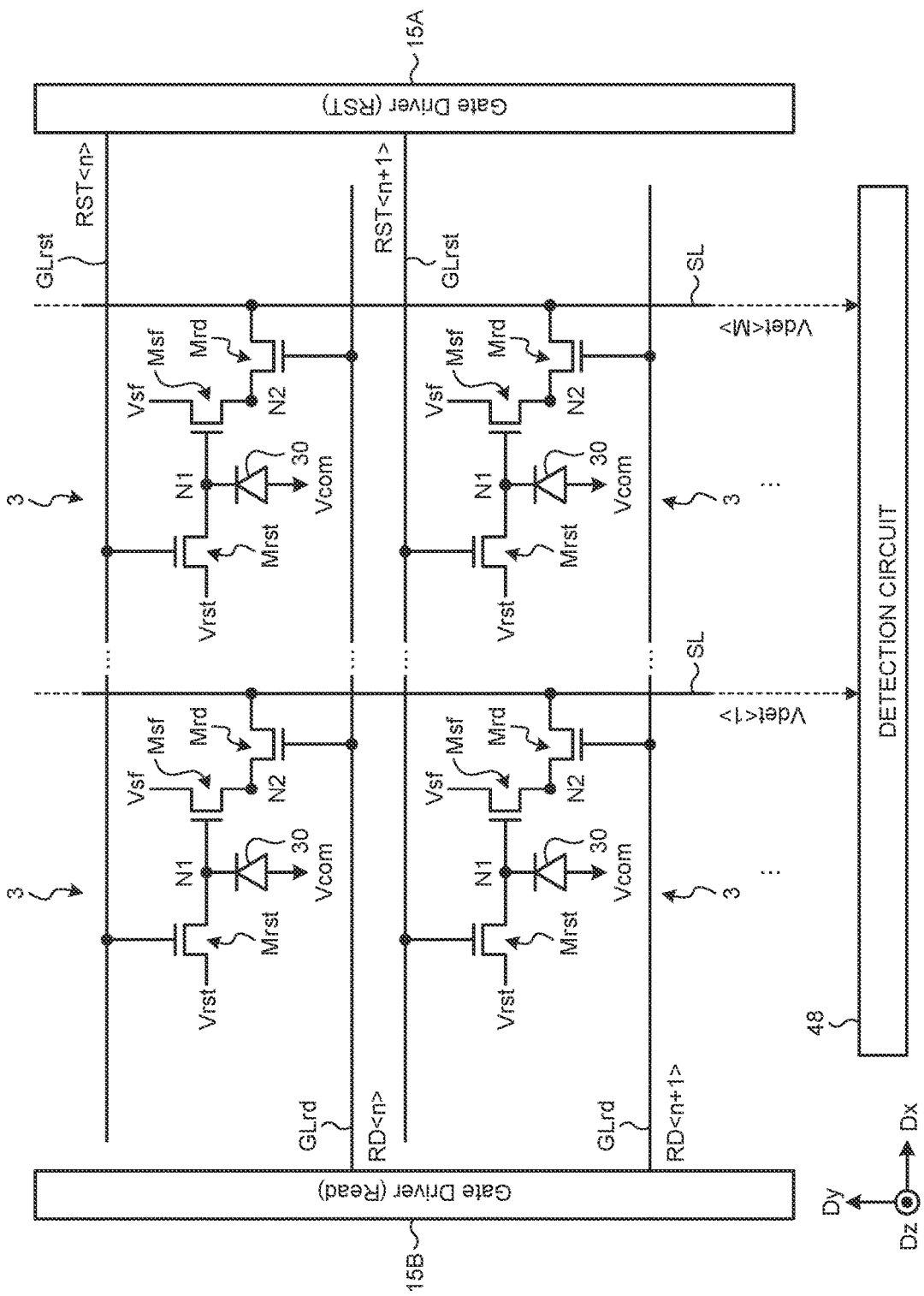
FIG. 5 is a circuit diagram illustrating a plurality of detection elements.

The signal line selection circuit 16 is a switching circuit that sequentially or simultaneously selects a plurality of output signal lines SL (refer to FIG. 5). The signal line selection circuit 16 is, for example, a multiplexer. The signal line selection circuit 16 couples the selected output signal lines SL to the detection circuit 48 based on the selection signal ASW supplied from the detection control circuit 11. Through this operation, the signal line selection circuit 16 outputs the detection signals Vdet from the detection elements 3 to the detector 40. The signal line selection circuit 16 may be omitted. In this case, the output signal lines SL may be directly coupled to the detection circuit 48.

The detector 40 includes the detection circuit 48, a signal processing circuit 44, a coordinate extraction circuit 45, a storage circuit 46, and a detection timing control circuit 47.

The detector 40 is a circuit that detects, at a relatively large pitch, whether the detection area AA is touched by the finger Fg, and detects, at a relatively small pitch, the fingerprint of the finger Fg, based on a control signal supplied from the detection control circuit 11 and a detection signal Vdet1 supplied from the detection element 3.

The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts an analog signal output from the detection signal amplifying circuit 42 into a digital signal.

The signal processing circuit 44 is a logic circuit that detects a predetermined physical quantity received by the sensor circuit 10 based on output signals of the detection circuit 48. Specifically, the signal processing circuit 44 detects that the finger Fg in contact with or in proximity to the detection area AA, based on the output signals of the detection circuit 48. The signal processing circuit 44 also detects the fingerprint of the finger Fg based on the output signals of the detection circuit 48. The signal processing circuit 44 may detect the information on the living body based on the output signals of the detection circuit 48. Examples of the information on the living body include the blood vessel image, the pulse wave, the pulsation, and a blood oxygen saturation level of the finger Fg or a palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor circuit 10 to generate two-dimensional information representing a shape of the asperities on the surface of the finger Fg or the like. The coordinate extraction circuit 45 may output the detection signals Vdet as sensor outputs Vo instead of calculating the detected coordinates.

With the configuration described above, the detection device 1 detects the finger Fg in contact with or in proximity to the detection area AA of the sensor circuit 10 (hereinafter referred to as "touch detection"). The detection device 1 also detects the fingerprint by detecting the asperities on the surface of the finger Fg in contact with the sensor circuit 10 (hereinafter referred to as "fingerprint detection").

The following describes a circuit configuration example and an operation example of the detection device 1. FIG. 5 is a circuit diagram illustrating the detection elements. As illustrated in FIG. 5, each of the detection elements 3 includes the photoelectric conversion element 30, a reset transistor Mrst, a read transistor Mrd, and a source follower transistor Msf. The detection elements 3 are provided with the reset control scan lines GLrst and the read control scan lines GLrd as detection drive lines (gate lines), and provided with the output signal lines SL as wiring for reading signals.

The reset control scan lines GLrst, the read control scan lines GLrd, and the output signal lines SL are each coupled to the detection elements 3. Specifically, the reset control scan lines GLrst and the read control scan lines GLrd extend in the first direction Dx (refer to FIG. 3), and are each coupled to the detection elements 3 arranged in the first direction Dx. The output signal lines SL extend in the second direction Dy, and are each coupled to the detection elements 3 arranged in the second direction Dy. The output signal lines SL are wiring from which signals from the transistors (read transistors Mrd and source follower transistors Msf) are output.

The reset transistor Mrst, the read transistor Mrd, and the source follower transistor Msf are provided correspondingly to each of the photoelectric conversion elements 30. Each of the transistors included in the detection element 3 is constituted by an n-type thin-film transistor (TFT). However, each of the transistors is not limited thereto, and may be constituted by a p-type TFT.

The reference potential Vcom is applied to the anode of the photoelectric conversion element 30. The cathode of the photoelectric conversion element 30 is coupled to a node N1. The node N1 is coupled to one of the source and the drain of the reset transistor Mrst, and to the gate of the source follower transistor Msf. When light irradiates the photoelectric conversion element 30, a signal (electric charge) output from the photoelectric conversion element 30 is stored in a capacitive element generated at the node N1.

The gate of the reset transistor Mrst is coupled to a corresponding one of the reset control scan lines GLrst. The other of the source and the drain of the reset transistor Mrst is supplied with a reset potential Vrst. When the reset transistor Mrst is turned on (into a conduction state) in response to the reset control signal RST supplied from the first gate line drive circuit 15A, the potential of the node N1 is reset to the reset potential Vrst. The reference potential Vcom has a potential lower than the reset potential Vrst, and the photoelectric conversion element 30 is driven in a reverse bias state.

The source follower transistor Msf is coupled between a terminal supplied with the power supply potential Vsf and the read transistor Mrd (node N2). The gate of the source follower transistor Msf is coupled to the node N1. The gate of the source follower transistor Msf is supplied with a signal (voltage) corresponding to the signal (electric charge) generated by the photoelectric conversion element 30. This operation causes the source follower transistor Msf to output a signal voltage corresponding to the signal (electric charge) generated by the photoelectric conversion element 30 to the read transistor Mrd.

The read transistor Mrd is coupled between the source of the source follower transistor Msf (node N2) and a corresponding one of the output signal lines SL. The gate of the read transistor Mrd is coupled to a corresponding one of the read control scan lines GLrd. When the read transistor Mrd is turned on in response to the read control signal RD supplied from the second gate line drive circuit 15B, the signal output from the source follower transistor Msf, that is, the signal (voltage) corresponding to the signal (electric charge) generated by the photoelectric conversion element 30 is output as the detection signal Vdet to the output signal line SL.

In FIG. 5, the reset transistor Mrst and the read transistor Mrd each have a single-gate structure. However, the reset transistor Mrst and the read transistor Mrd may each have what is called a double-gate structure constituted by two transistors coupled in series, or may be have a configuration constituted by three or more transistors coupled in series. The circuit of each of the detection elements 3 is not limited to the configuration including the three transistors of the reset transistor Mrst, the source follower transistor Msf, and the read transistor Mrd. The detection element 3 may have two transistors or four or more transistors.

Figure 6:
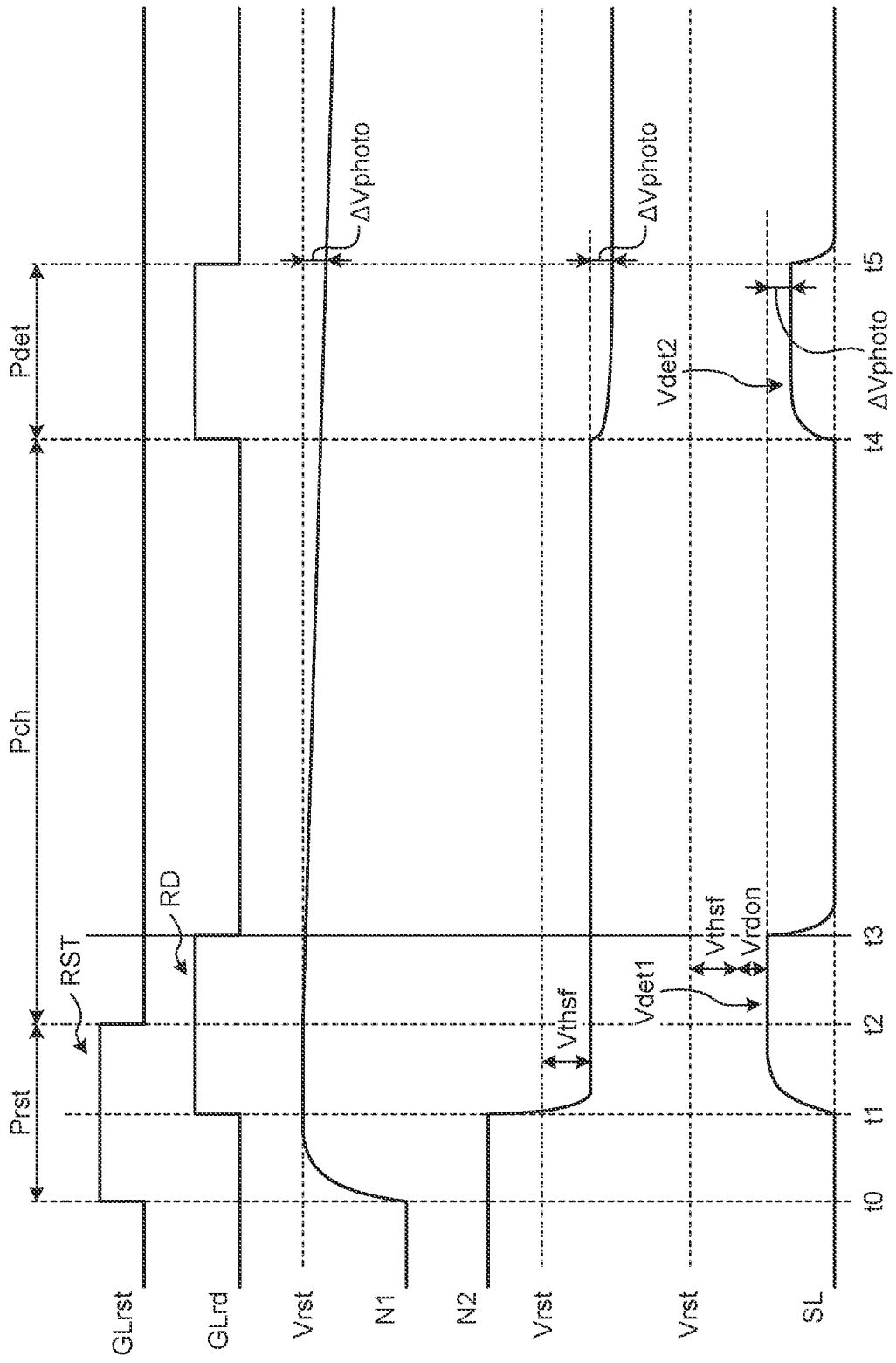
FIG. 6 is a timing waveform diagram illustrating an operation example of one of the detection elements during a detection period.

FIG. 6 is a timing waveform diagram illustrating an operation example of the detection element during the detection period. As illustrated in FIG. 6, the detection element 3 performs the detection in the order of a reset period Prst, an exposure period Pch, and a read period Pdet during the detection period. The power supply circuit 103 supplies the reference potential Vcom to the anode of the photoelectric conversion element 30 over the reset period Prst, the exposure period Pch, and the read period Pdet.

At time t0, the control circuit 102 sets the reset control signal RST supplied to the reset control scan line GLrst to HIGH (high-level voltage) to start the reset period Prst. In the reset period Prst, the reset transistor Mrst is turned on (into the conduction state) and for example, an electric charge is stored in self-capacitance or non-illustrated capacitance in the photoelectric conversion element 30 to increase the potential of the node N1 to the reset potential Vrst. As a result, the photoelectric conversion element 30 is reverse-biased by the potential difference between the reset potential Vrst and the reference potential Vcom. The read transistor Mrd is off (in a nonconduction state). Hence, the source of the source follower transistor Msf is charged by the power supply potential Vsf to increase the potential of the node N2.

At time t1, the control circuit 102 sets the read control signal RD supplied to the read control scan line GLrd to HIGH (high-level voltage). As a result, the read transistor Mrd is turned on (into the conduction state) to set the potential of the node N2 to (Vrst−Vthsf). Vthsf denotes a threshold voltage Vthsf of the source follower transistor Msf.

At time t2, the control circuit 102 sets the reset control signal RST to LOW (low-level voltage) to end the reset period Prst and start the exposure period Pch. In the exposure period Pch, the reset transistor Mrst is turned off (into the nonconduction state). The signal corresponding to the light irradiating the photoelectric conversion element 30 is stored, and the potential of the node N1 is reduced to (Vrst−ΔVphoto). Specifically, during the exposure period Pch, for example, an electric charge stored in the reset period Prst is discharged by the light irradiation, and a signal corresponding to the irradiating light is stored. ΔVphoto denotes the signal (voltage change amount) corresponding to the light irradiating the photoelectric conversion element 30, and is relatively smaller in a dark area while relatively larger in a bright area.

At time t3, the potential of the detection signal Vdet1 output from the output signal line SL is set to (Vrst−Vthsf−Vrdon). Vrdon denotes a voltage drop caused by on-resistance of the read transistor Mrd.

At time t3, the control circuit 102 sets the read control signal RD to LOW (low-level voltage). As a result, the read transistor Mrd is turned off (into the nonconduction state) to set the potential of the node N2 to be constant at (Vrst−Vthsf). The output signal line SL is loaded so as to output the detection signal Vdet at LOW (low-level voltage).

At time t4, the control circuit 102 sets the read control signal RD to HIGH (high-level voltage). As a result, the read transistor Mrd is turned on (into the conduction state) after the exposure period Pch ends, and the read period Pdet starts. The potential of the node N2 changes to (Vrst−Vthsf−ΔVphoto) according to the signal ΔVphoto. The potential of a detection signal Vdet2 output in the read period Pdet decreases by an amount of the signal ΔVphoto from the potential of the detection signal Vdet1 obtained at time t3, and thus is set to (Vrst−Vthsf−Vrdon−ΔVphoto).

The detector 40 can detect the light irradiating the photoelectric conversion element 30 based on the signal (ΔVphoto) of the difference between the detection signal Vdet1 at time t3 and the detection signal Vdet2 at time t5.

While FIG. 6 illustrates the operation example of one of the detection elements 3, the first gate line drive circuit 15A and the second gate line drive circuit 15B can cause the detection elements 3 in the entire detection area AA to perform the detection by sequentially scanning the reset control scan lines GLrst and the read control scan lines GLrd in a time-division manner.

Figure 7:
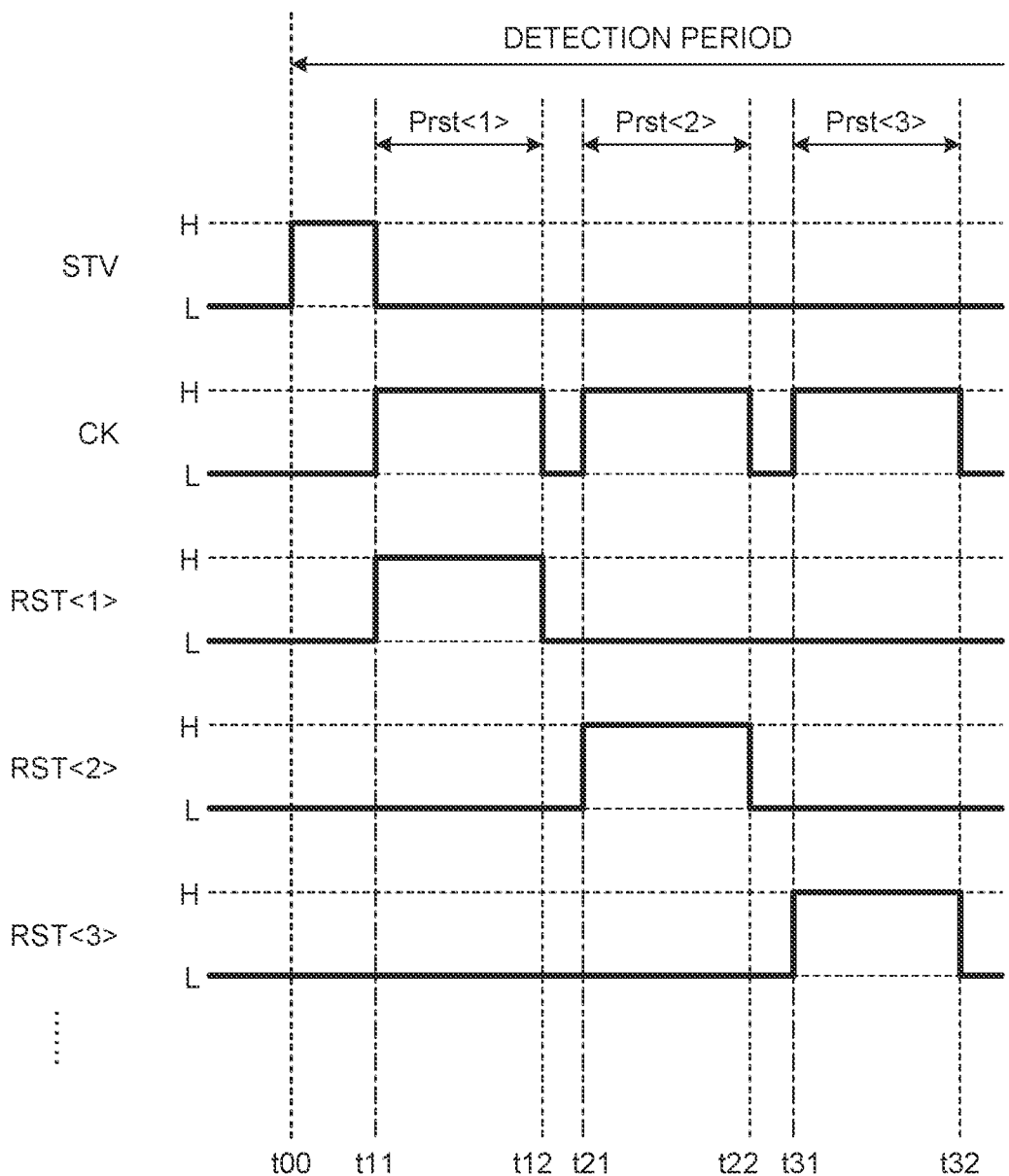
FIG. 7 is a timing diagram illustrating an example of output timing of reset control signals during the detection period.

FIG. 7 is a timing diagram illustrating an example of output timing of the reset control signals during the detection period.

As illustrated in FIG. 7, at time t00 when the detection period starts, the synchronization signal STV is controlled to be "H" (high-level voltage), and reset control signals RST<1>, RST<2>, RST<3>, . . . are sequentially controlled to be "H" (high-level voltage) at each rising edge of the clock signal CK. A period when the reset control signal RST<1> is "H" (high-level voltage) corresponds to a reset period Prst<1> in the first row of the detection elements 3 arranged in the first direction Dx of the detection area AA. A period when the reset control signal RST<2> is "H" (high-level voltage) corresponds to a reset period Prst<2> in the second row of the detection elements 3 arranged in the first direction Dx of the detection area AA. A period when the reset control signal RST<3> is "H" (high-level voltage) corresponds to a reset period Prst<3> in the third row of the detection elements 3 arranged in the first direction Dx of the detection area AA.

In the present disclosure, the detection device 1 serving as the optical sensor described above is repeatedly alternately provided with a first period provided with successive touch detection periods for performing the touch detection and a second period for performing the fingerprint detection, and thereby performs both the optical touch detection and the fingerprint detection. The following describes a configuration and an operation to perform both the optical touch detection and the fingerprint detection.

First Embodiment

Figure 8:
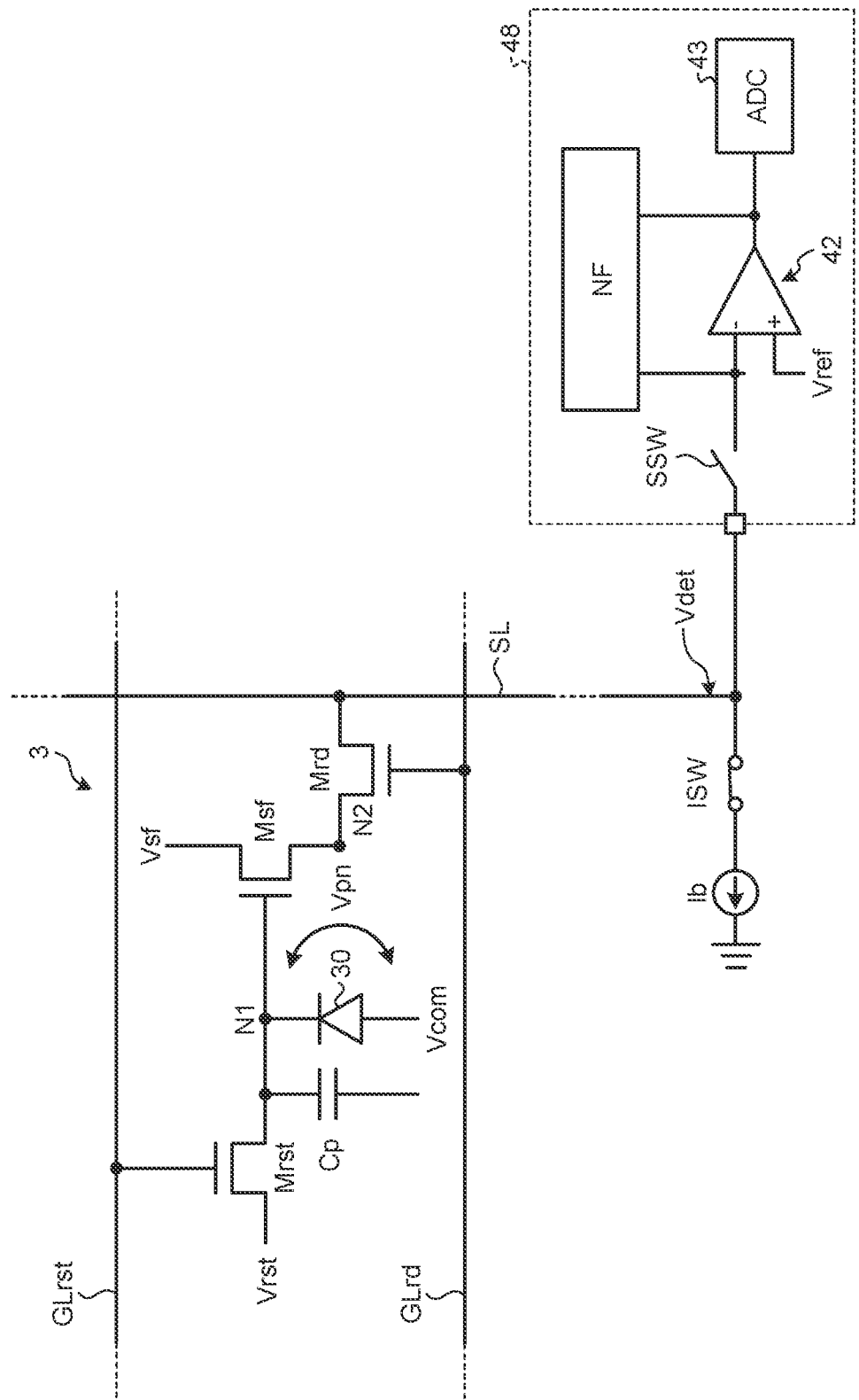
FIG. 8 is a diagram illustrating a coupling example of the detection element and a detection circuit of the detection device according to a first embodiment of the present disclosure.

FIG. 8 is a diagram illustrating a coupling example of the detection element and the detection circuit of the detection device according to a first embodiment of the present disclosure. As describes above, the photoelectric conversion element 30 is reverse-biased during the reset period Prst. At this time, a reverse bias voltage Vpn serving as a potential difference between the reset potential Vrst and the reference potential Vcom is applied to the photoelectric conversion element 30.

An input terminal of the detection circuit 48 is coupled to a constant-current source for flowing a bias current Ib to the read transistor Mrd. This configuration enables the detection of the detection signal Vdet applied to the output signal line SL by the detection element 3. This constant-current source may be provided in the detection circuit 48 or on the substrate 21. In FIG. 8, capacitance Cp may be parasitic capacitance of the photoelectric conversion element 30 or individual capacitance outside the photoelectric conversion element 30.

The detection circuit 48 is coupled to the output signal line SL during the read period Pdet (refer to FIG. 6). The detection signal amplifying circuit 42 of the detection circuit 48 outputs a voltage corresponding to the voltage of the output signal line SL to the A/D conversion circuit 43. The configuration of the detection circuit 48 is a configuration that enables the touch detection during a touch detection period TP of the first period and the fingerprint detection during a fingerprint detection period FP of the second period, which are to be described below, and enables detection of a potential drop of the detection signal Vdet based on changes in capacitance values to be described later. Negative feedback NF of the detection signal amplifying circuit 42 is configured to be switchable between detection of the voltage of the output signal line SL and detection of the capacitance so as to be capable of performing both of these detections. For example, when detecting the voltage of the output signal line SL, a resistor constitutes the negative feedback loop of the detection signal amplifying circuit 42, and when detecting the capacitance value, a capacitor constitutes the negative feedback loop of the amplifying circuit 42. The present disclosure is not limited by the configuration of the detection circuit 48.

Figure 9:
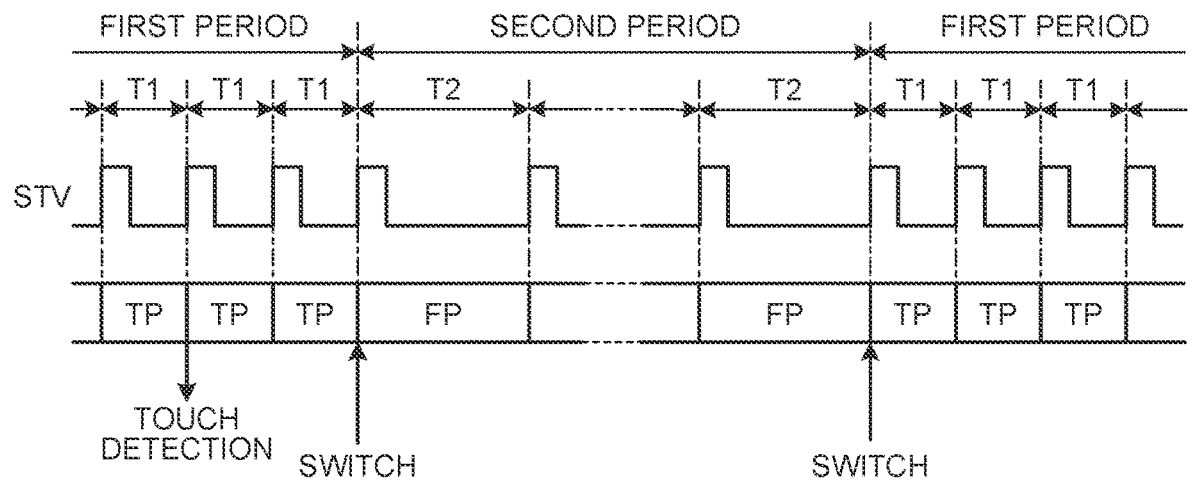
FIG. 9 is a timing diagram illustrating an example of detection switching operations of the detection device according to the first embodiment.

FIG. 9 is a timing diagram illustrating an example of detection switching operations of the detection device according to the first embodiment. In FIG. 9, TP denotes the touch detection period, and FP denotes the fingerprint detection period.

In the present embodiment, as illustrated in FIG. 9, the detection control circuit 11 switches from the first period to the second period according to a touch determination result in the touch detection period TP of the first period. More specifically, the period shifts to the second period when the state is detected as the touch state in the touch detection period TP of the first period in which the touch detection is performed, and makes a transition to the first period after the fingerprint detection is performed in the fingerprint detection period FP of the second period.

Figure 10:
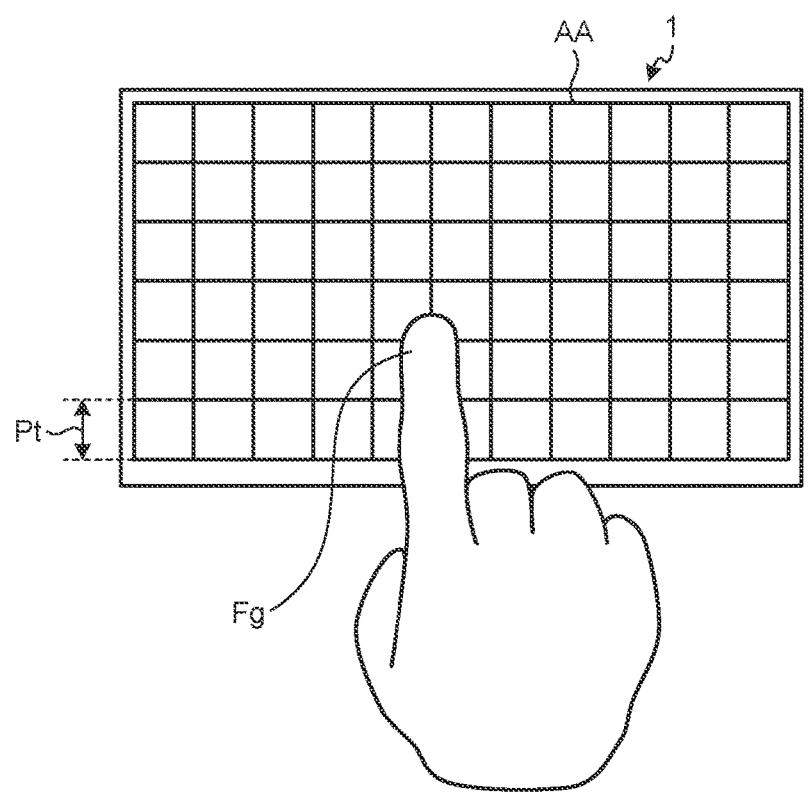
FIG. 10 is a diagram illustrating an example of an operation during a first period of the detection device according to the first embodiment.
Figure 11:
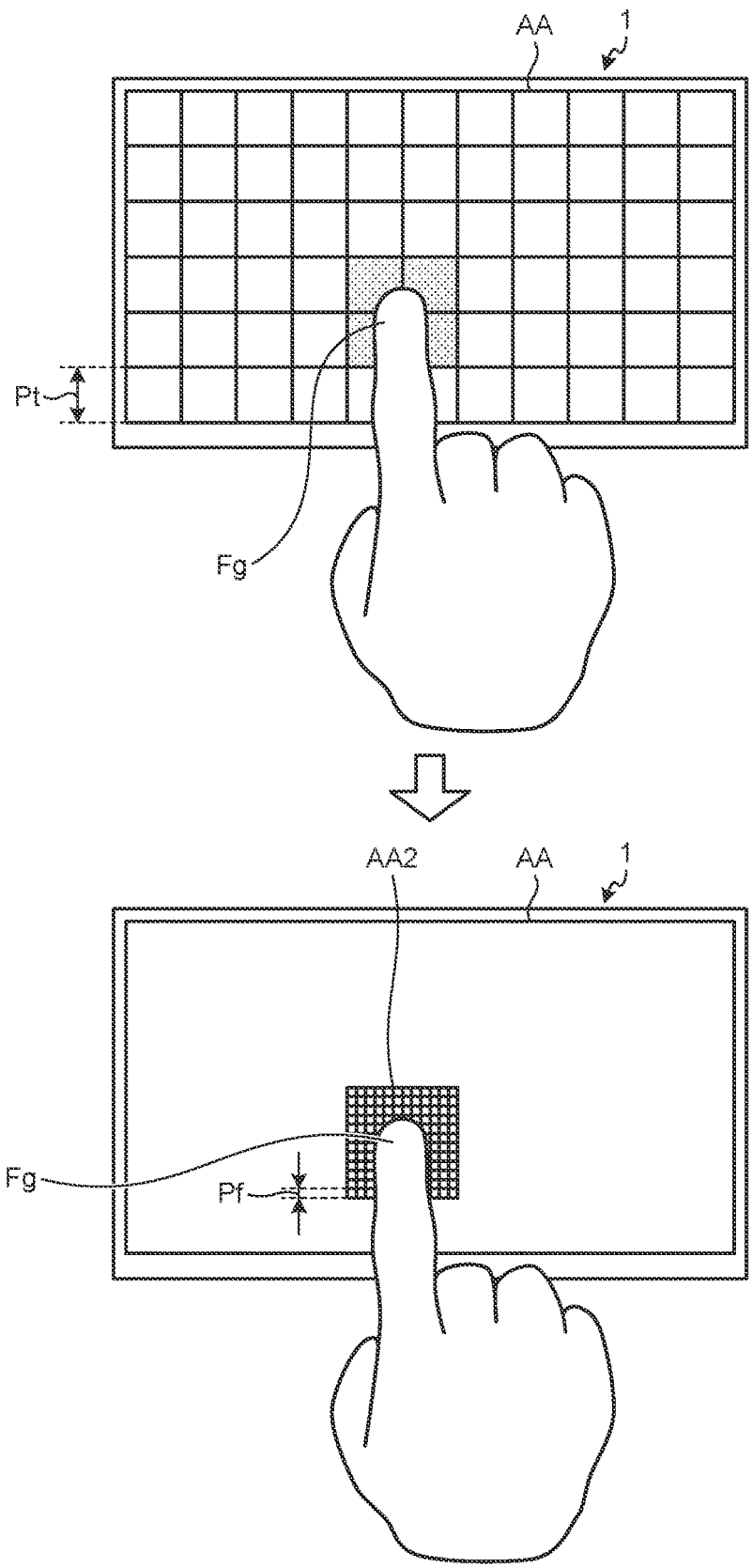
FIG. 11 is a diagram illustrating an example of an operation of making a transition from the first period to a second period of the detection device according to the first embodiment.

The following describes a specific detection operation transition of the detection device 1 according to the first embodiment. FIG. 10 is a diagram illustrating an example of an operation during the first period of the detection device according to the first embodiment. FIG. 11 is a diagram illustrating an example of an operation of making a transition from the first period to the second period of the detection device according to the first embodiment.

As illustrated in FIG. 10, when performing the touch detection in the touch detection period TP of the first period, the detector 40 uses the detection elements 3, among the detection elements 3 included in the detection area AA, that are arranged at a first detection pitch Pt larger than when performing the fingerprint detection in the fingerprint detection period FP of the second period (refer to the lower portion of FIG. 11) to scan the entire surface of the detection area AA, and thereby detects the finger Fg or the like, more specifically, detects the position of the finger Fg in the detection area AA (coordinate position of the finger Fg in the detection area AA).

In a case where the touch detection in the touch detection period TP of the first period is performed, if the number of the detection elements 3 arranged in the first direction Dx in the detection area AA is 1080, the detector 40 performs the touch detection using, for example, 18×30 of the detection elements 3 obtained by dividing the detection area AA into 18 portions in the first direction Dx and into 30 portions in the second direction Dy. In other words, in the touch detection period TP of the first period, the detector 40 performs the touch detection using the detection elements 3 provided at intervals of 60 rows in the first direction Dx and at intervals of 78 columns in the second direction Dy. That is, the first detection pitch Pt is 60 in the first direction Dx and 78 in the second direction Dy.

If the finger Fg or the like is detected in the touch detection period TP of the first period illustrated in FIG. 10, the period makes a transition to the fingerprint detection period FP of the second period. In the fingerprint detection period FP, the detector 40 performs the fingerprint detection in a predetermined partial detection area AA2 that includes the position where the finger Fg has been detected (coordinate position of the finger Fg in the detection area AA), using the detection elements 3, among the detection elements 3 included in the partial detection area AA2, that are arranged at a second detection pitch Pf smaller than when performing the touch detection. The position and size of the partial detection area AA2 can be changed based on information on, for example, a finger Fin detected in the touch detection period TP of the first period. Specifically, the detector 40 sets the partial detection area AA2 to, for example, a predetermined area having central coordinates in the position where the finger Fg has been detected (coordinate position of the finger Fg in the detection area AA) in the touch detection period TP of the first period.

When performing the fingerprint detection in the fingerprint detection period FP of the second period, the detector 40 performs the fingerprint detection using, for example, all the detection elements 3 included in the partial detection area AA2. That is, the second detection pitch Pf is one in the first direction Dx and one in the second direction Dy.

As described above, when the touch detection is performed in the touch detection period TP of the first period, the touch detection is performed at a first detection pitch Pts larger than the pitch used when the fingerprint detection is performed in the fingerprint detection period FP of the second period. In the touch detection, the exposure period Pch (refer to FIG. 6) can be shortened because the finger Fg in contact with or in proximity to the detection area AA of the sensor circuit 10 only needs to be detected. As a result, as illustrated in FIG. 9, an interval T1 of the synchronization signal STV in the touch detection period TP of the first period, that is, the length of the touch detection period TP can be set shorter than an interval T2 of the synchronization signal STV in the fingerprint detection period FP of the second period, that is, the length of the fingerprint detection period FP.

The detection device 1 according to the first embodiment described above uses the optical sensor to perform the touch detection and the fingerprint detection. This configuration can restrain the reduction in manufacturing yield. This configuration can also restrain the reduction in transmittance when combining the detection device 1 according to the first embodiment with a display device.

Second Embodiment

The optical sensor cannot perform the detection operation if the amount of light serving as a detecting medium is lower than a lower limit for detection. In a second embodiment of the present disclosure, an example will be described in which, for example, the detection device 1 according to the embodiment is incorporated in a display device of a portable electronic apparatus, and the detection operation is enabled even in a situation where fingerprint authentication is performed in a dark environment such as during night hours in a state where the illumination device 121 illustrated in FIG. 1 (for example, the backlight of the portable electronic apparatus provided with the detection device 1) is off.

Figure 12:
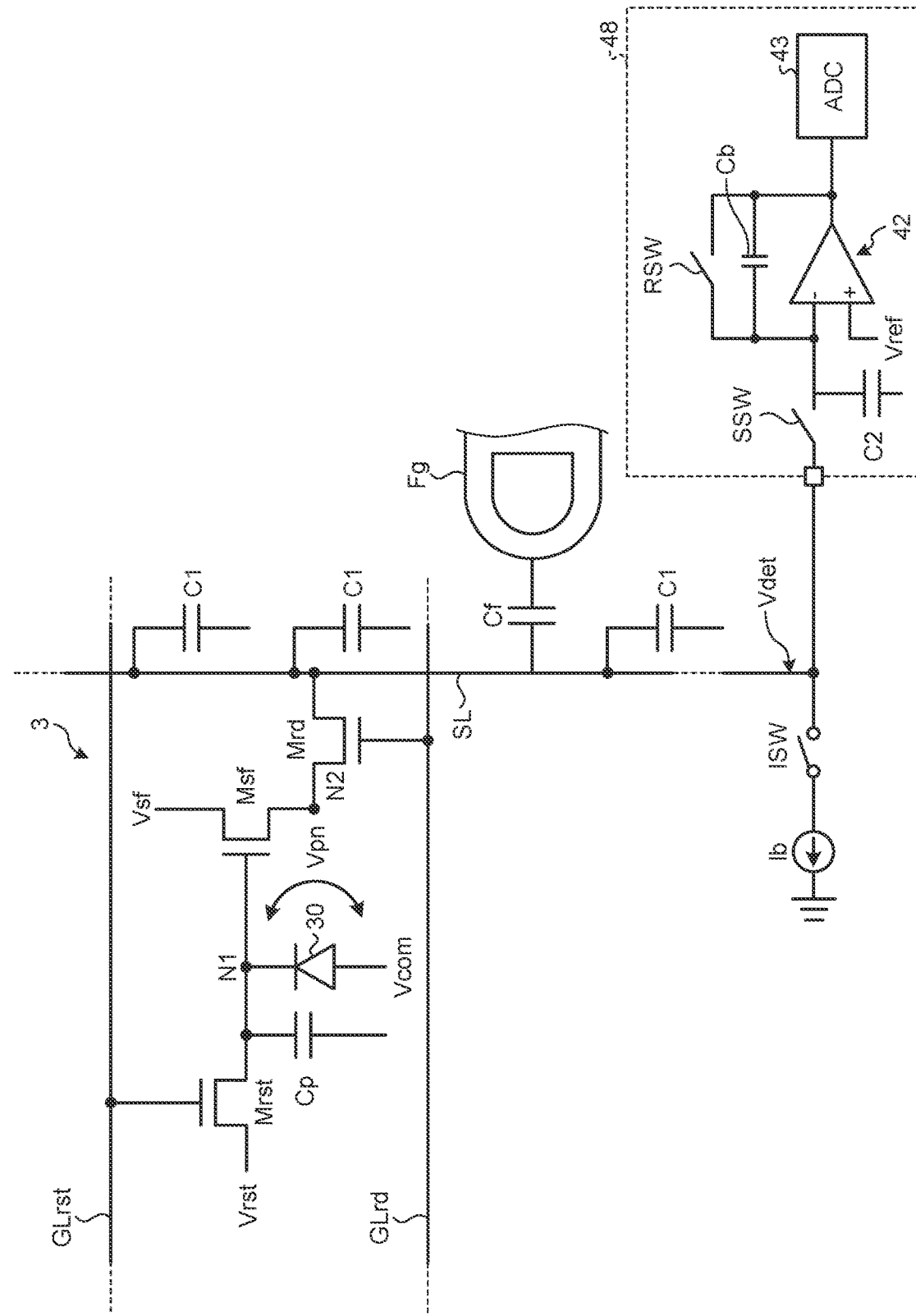
FIG. 12 is a diagram illustrating a coupling example of the detection element and the detection circuit of the detection device according to a second embodiment of the present disclosure.
Figure 13:
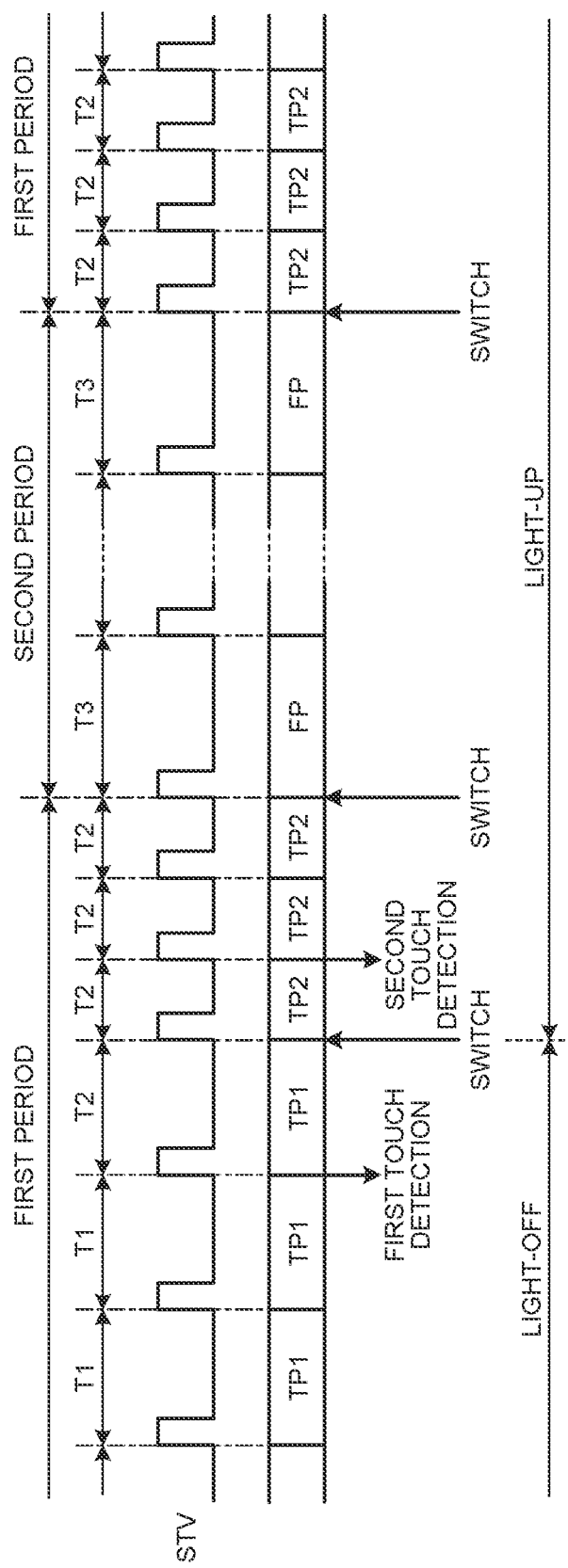
FIG. 13 is a timing diagram illustrating an example of detection switching operations of the detection device according to the second embodiment.

FIG. 12 is a diagram illustrating a coupling example of the detection element and the detection circuit of the detection device according to the second embodiment. FIG. 13 is a timing diagram illustrating an example of detection switching operations of the detection device according to the second embodiment. In FIG. 13, TP1 denotes a first touch detection period, and TP2 denotes a second touch detection period.

As illustrated in FIG. 12, by controlling a switch ISW to be turned off to electrically decouple the constant-current source Ib for conducting the bias current to the read transistor Mrd, the detection can be performed for the potential drop of the detection signal Vdet that occurs based on the changes in capacitance values of parasitic capacitance C1 of the output signal line SL, input capacitance C2 of the detection circuit 48, and electrostatic capacitance Cf generated between a path of the detection signal Vdet and the finger Fg. In this case, for example, the negative feedback NF of the detection circuit 48 has been switched to have a configuration illustrated in FIG. 12. The configuration of the detection circuit 48 illustrated in FIG. 12 in this case is merely an example, and is not limited to the configuration illustrated in FIG. 12.

In the present embodiment, as illustrated in FIG. 13, the detection control circuit 11 makes a transition to the second touch detection period TP2 according to a first touch determination result in the first touch detection period TP1 of the first period, and switches from the first period to the second period according to the first touch determination result in the second touch detection period TP2 of the first period. More specifically, the period makes a transition to the second touch detection period TP2 when the state is detected as the touch state in the first touch detection period TP1 of the first period in which the first touch detection is performed, and makes a transition to the second period when the state is detected as the touch state in the second touch detection period TP2. After the fingerprint detection is performed in the fingerprint detection period of the second period, the detection control circuit 11 makes a transition to the second touch detection period TP2 of the first period.

Figure 14:
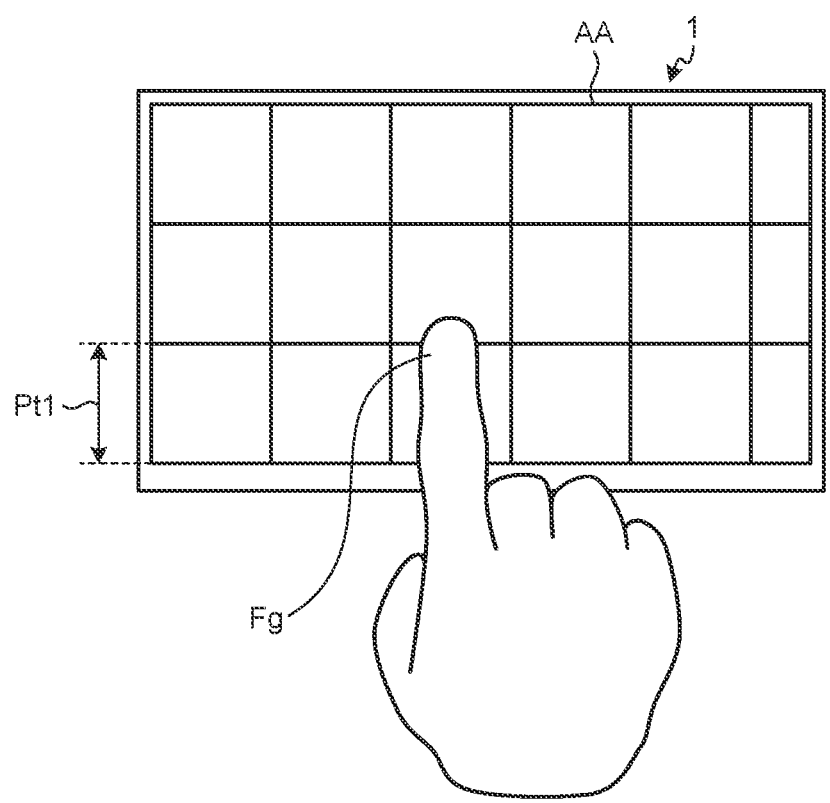
FIG. 14 is a diagram illustrating an example of an operation during a first touch detection period of the first period of the detection device according to the second embodiment.
Figure 15:
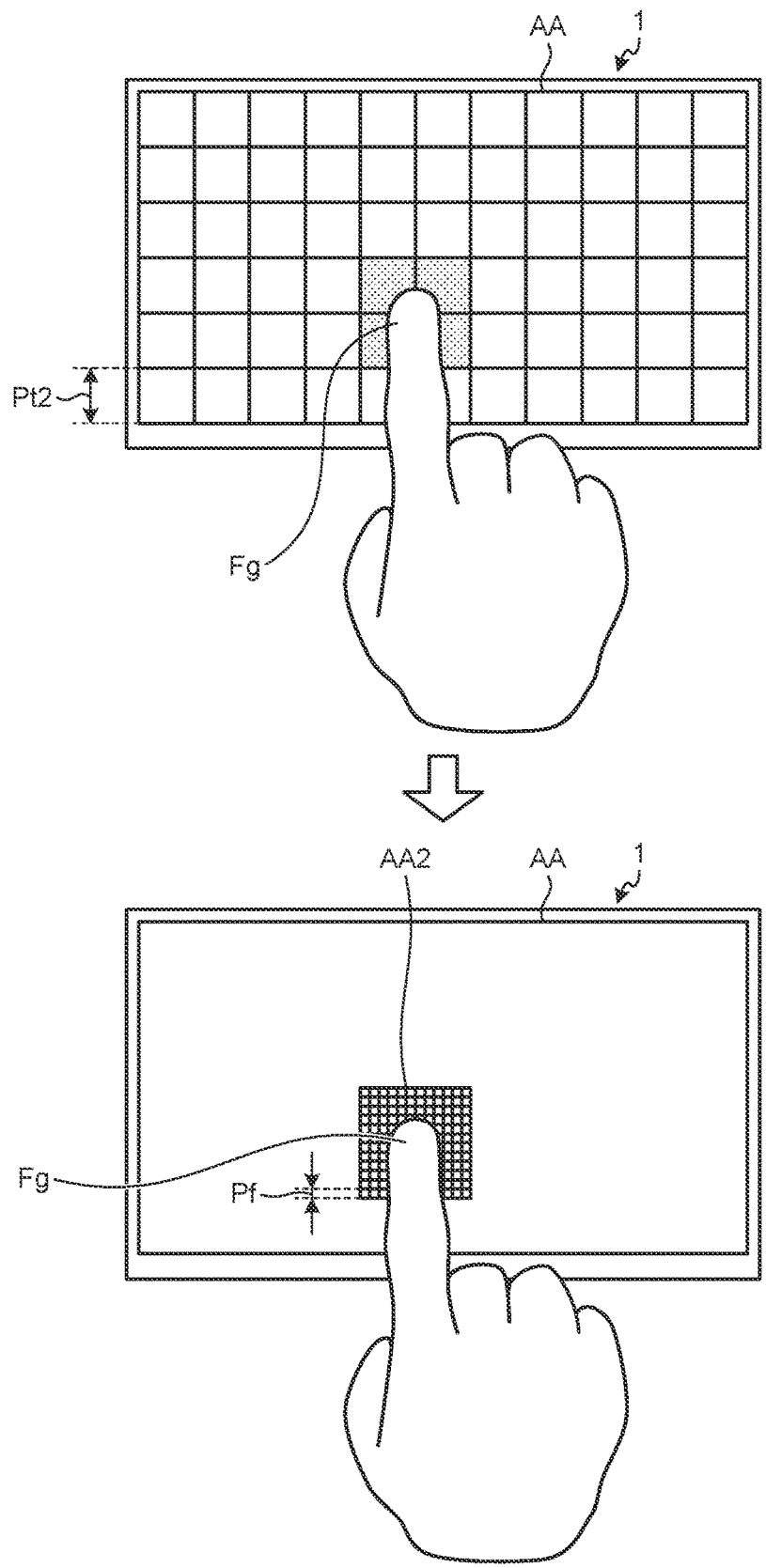
FIG. 15 is a diagram illustrating an example of an operation of making a transition from a second touch detection period of the first period to the second period of the detection device according to the second embodiment.

The following describes a specific detection operation transition of the detection device 1 according to the second embodiment. FIG. 14 is a diagram illustrating an example of an operation during the first touch detection period of the first period of the detection device according to the second embodiment. FIG. 15 is a diagram illustrating an example of an operation of making a transition from the second touch detection period of the first period to the second period of the detection device according to the second embodiment.

As illustrated in FIG. 14, when performing the first touch detection in the first touch detection period TP1 of the first period, the detection control circuit 11 controls the switch ISW to be turned off to electrically decouple the constant-current source Ib, and the detector 40 uses the detection elements 3, among the detection elements 3 included in the detection area AA, that are arranged at a first detection pitch Pt1 larger than when performing the second touch detection in the second touch detection period TP2 (refer to the upper portion of FIG. 15) to scan the entire surface of the detection area AA, and thereby detects whether the finger Fg or the like is present.

In a case where the first touch detection in the first touch detection period TP1 of the first period is performed, if the number of the detection elements 3 arranged in the first direction Dx in the detection area AA is 1080, the detector 40 performs the first touch detection using, for example, 6×10 of the detection elements 3 obtained by dividing the detection area AA into 6 portions in the first direction Dx and into 10 portions in the second direction Dy. In other words, in the first touch detection period TP1 of the first period, the detector 40 performs the first touch detection using the detection elements 3 provided at intervals of 180 rows in the first direction Dx and at intervals of 234 columns in the second direction Dy. That is, the first detection pitch Pt1 is 180 in the first direction Dx and 234 in the second direction Dy.

If the finger Fg or the like is detected in the first touch detection period TP1 of the first period illustrated in FIG. 14, the detection control circuit 11 controls the switch ISW to be turned on to make a transition to the second touch detection period TP2, and, if the illumination device 121 (refer to FIG. 1, for example the backlight of the portable electronic apparatus provided with the detection device 1) is off in the first touch detection period TP1 of the first period, lights up the illumination device 121, as illustrated in FIG. 12. In the second touch detection period TP2, as illustrated in FIG. 15, the detector 40 uses the detection elements 3, among the detection elements 3 included in the detection area AA, that are arranged at a second detection pitch Pt2 smaller than when detecting whether the finger Fg or the like is present in the first touch detection period TP1 (refer to FIG. 14) to scan the entire surface of the detection area AA, and thereby detects the position of the finger Fg in the detection area AA (coordinate position of the finger Fg in the detection area AA).

In a case where the second touch detection in the second touch detection period TP2 of the first period is performed, if the number of the detection elements 3 arranged in the first direction Dx in the detection area AA is 1080, the detector 40 performs the second touch detection using, for example, 18×30 of the detection elements 3 obtained by dividing the detection area AA into 18 portions in the first direction Dx and into 30 portions in the second direction Dy. In other words, in the second touch detection period TP2 of the first period, the detector 40 performs the second touch detection using the detection elements 3 provided at intervals of 60 rows in the first direction Dx and at intervals of 78 columns in the second direction Dy. That is, the second detection pitch Pt2 is 60 in the first direction Dx and 78 in the second direction Dy.

If the finger Fg or the like is detected in the second touch detection period TP2 of the first period, the period makes a transition to the fingerprint detection period FP of the second period as illustrated in FIG. 15. In the fingerprint detection period FP, the detector 40 performs the fingerprint detection in the predetermined partial detection area AA2 that includes the position where the finger Fg has been detected (coordinate position of the finger Fg in the detection area AA), using the detection elements 3, among the detection elements 3 included in the partial detection area AA2, that are arranged at a third detection pitch Pf further smaller than when performing the touch detection in the second touch detection period TP2 of the first period. The position and size of the partial detection area AA2 can be changed based on the information on, for example, the finger Fin detected in the second touch detection period TP2 of the first period.

When performing the fingerprint detection in the fingerprint detection period FP of the second period, the detector 40 performs the fingerprint detection using, for example, all the detection elements 3 included in the partial detection area AA2. That is, the third detection pitch Pf is one in the first direction Dx and one in the second direction Dy.

As described above, when detecting whether the finger Fg or the like is present in the first touch detection period TP1 of the first period, the touch detection is performed at the first detection pitch Pt1 larger than the pitch used when detecting the position of the finger Fg in the detection area AA (coordinate position of the finger Fg in the detection area AA) in the second touch detection period TP2. When detecting whether the finger Fg or the like is present in the first touch detection period TP1, the interval T1 of the synchronization signal STV in the first touch detection period TP1 of the first period, that is, the length of the first touch detection period TP1 is set to be longer than the interval T2 of the synchronization signal STV in the second touch detection period TP2, that is, longer than the second touch detection period TP2, as illustrated in FIG. 13. This configuration can reduce power consumption during a standby time.

When detecting the position of the finger Fg in the detection area AA (coordinate position of the finger Fg in the detection area AA) in the second touch detection period TP2 of the first period, the touch detection is performed at the second detection pitch Pt2 larger than the pitch used when performing the fingerprint detection in the fingerprint detection period FP of the second period. In the touch detection, the exposure period Pch (refer to FIG. 6) can be shortened because the finger Fg in contact with or in proximity to the detection area AA of the sensor circuit 10 only needs to be detected. As a result, as illustrated in FIG. 13, the interval T2 of the synchronization signal STV in the second touch detection period TP2 of the first period, that is, the length of the first touch detection period TP2 can be set shorter than an interval T3 of the synchronization signal STV in the fingerprint detection period FP of the second period, that is, the length of the fingerprint detection period FP.

The detection device 1 according to the second embodiment described above uses the optical sensor to perform the touch detection and the fingerprint detection. This configuration can restrain the reduction in manufacturing yield. This configuration can also restrain the reduction in transmittance when combining the detection device 1 according to the first embodiment with a display device.

Third Embodiment

Figure 16:
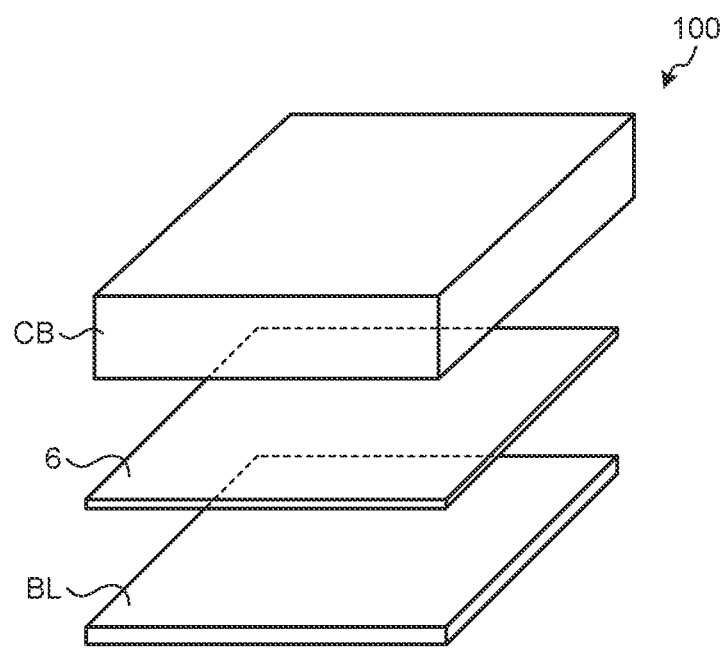
FIG. 16 is a perspective view schematically illustrating a display device according to a third embodiment of the present disclosure.
Figure 17:
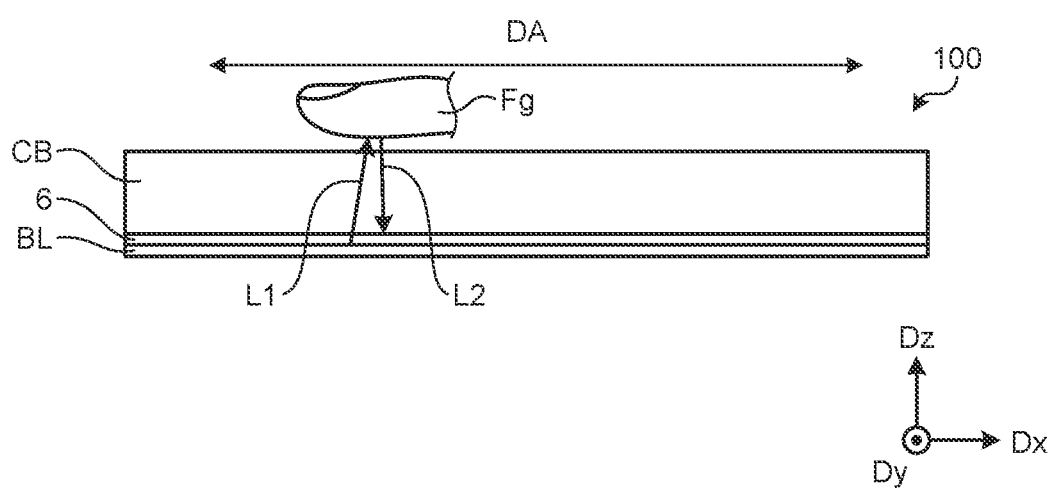
FIG. 17 is a sectional view schematically illustrating a section of the display device according to the third embodiment.

FIG. 16 is a perspective view schematically illustrating a display device according to a third embodiment of the present disclosure. FIG. 17 is a sectional view schematically illustrating a section of the display device according to the third embodiment. FIG. 18 is a plan view schematically illustrating an arrangement relation between pixels in a display area and light-receiving elements in a detection area of the display device according to the third embodiment.

As illustrated in FIG. 16, a display device 100 includes a display panel 6, a light-transmitting cover member CB, and a backlight BL. In the example illustrated in FIG. 16, the display panel 6 is what is called an in-cell liquid crystal display panel with a built-in optical sensor. The cover member CB is superimposed on a visible side of the display panel 6.

The optical sensor has the detection area that overlaps a display area DA of the display panel 6. As illustrated in FIG. 17, when the light L1 of the backlight BL passes through the display panel 6 and the cover member CB to reach the object to be detected Fg, the light L2 transmitted through or reflected from the object to be detected Fg passes through the cover member CB, and is incident on the detection element provided on the display panel 6.

The display panel 6 is not limited to the liquid crystal display panel, and may be a self-luminous panel such as an organic EL (OLED) display panel or an inorganic EL (micro-LED or mini-LED) display.

FIG. 18 is a partial magnified plan view of a portion of the display area DA of the display panel 6 viewed from the third direction Dz (cover member CB side), where the photo-diodes PD are arranged in respective pixels PIX. The photodiodes PD can detect the information on the object to be detected Fg using the light emitted from the backlight BL.

Each of the pixels PIX includes sub-pixels SPX-R, SPX-G, and SPX-B. Color regions in three colors of red (R), green (G), and blue (B) are associated as one set with sub-pixels SPX-R, SPX-G, and SPX-B. Hereafter, the sub-pixels SPX-R, SPX-G, and SPX-B are each called "sub-pixel SPX" when not distinguished from one another. The sub-pixels SPX each include a switching element Trr. A pixel signal line SLS extends in the second direction Dy. The pixel signal line SLS is wiring for supplying a pixel signal to each pixel electrode. A scan line GLS extends in the first direction Dx. The scan line GLS is wiring for supplying a drive signal (scan signal) to drive each of the switching elements Trr.

The same effects as those of the first and the second embodiments described above can be obtained by applying the sensor circuit 10 of the detection device 1 according to the first and the second embodiments described above as the optical sensor built into the display panel 6 of the display device 100 according to the present embodiment, and by further achieving an aspect that includes the detection control circuit 11, the first gate line drive circuit 15A, the second gate line drive circuit 15B, the signal line selection circuit 16, and the detector 40 of the detection device 1 according to the first and the second embodiments. In the example illustrated in FIG. 18, the photodiode PD corresponds to the photoelectric conversion element 30; wiring SL corresponds to the output signal line SL of the detection device 1 according to the first and the second embodiments; and wiring GL corresponds to the reset control scan line GLrst and the read control scan line GLrd.

The display device 100 according to the third embodiment described above uses the optical sensor to perform the touch detection and the fingerprint detection. This configuration can restrain the reduction in transmittance and the reduction in manufacturing yield.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A detection device comprising:
   a sensor circuit in which a plurality of detection elements each comprising a photoelectric conversion element are arranged in a matrix having a row-column configuration in a detection area; and
   a detector having a touch detection period of detecting an object to be detected in contact with or in proximity to the sensor circuit and a fingerprint detection period of detecting asperities on a surface of the object to be detected, wherein
   the detector is configured to:
      perform detection in the touch detection period by selecting the detection elements arranged on a substrate at a first detection pitch among the detection elements included in the detection area; and
      perform the detection in the fingerprint detection period by selecting the detection elements arranged on the substrate at a second detection pitch smaller than the first detection pitch among the detection elements included in the detection area.

2. The detection device according to claim 1, wherein the detector is configured to perform the detection in the fingerprint detection period in a partial detection area smaller than an area in which the detection is performed in the touch detection period.

3. The detection device according to claim 2, wherein the detector is configured to make a transition to the fingerprint detection period when the object to be detected in contact with or in proximity to the sensor circuit is detected in the touch detection period.

4. The detection device according to claim 3, wherein the detector is configured to set the partial detection area to a predetermined area that includes a position where the object to be detected in contact with or in proximity to the sensor circuit is detected in the touch detection period.

5. The detection device according to claim 2, wherein the touch detection period is shorter than the fingerprint detection period.

6. The detection device according to claim 2, wherein an exposure period of the touch detection period is shorter than an exposure period of the fingerprint detection period.

7. The detection device according to claim 1, wherein each of the detection elements comprises:
a reset transistor configured to apply a reset potential to a cathode of the photoelectric conversion element;
a source follower transistor configured to output a signal corresponding to a potential generated by the photoelectric conversion element; and
a read transistor configured to read an output signal of the source follower transistor.

8. A detection device comprising:
a sensor circuit in which a plurality of detection elements each comprising a photoelectric conversion element are arranged in a matrix having a row-column configuration in a detection area; and
a detector having a touch detection period of detecting an object to be detected in contact with or in proximity to the sensor circuit and a fingerprint detection period of detecting asperities on a surface of the object to be detected, wherein
the detector is configured to:
perform detection in the touch detection period using the detection elements arranged at a first detection pitch among the detection elements included in the detection area; and
perform the detection in the fingerprint detection period using the detection elements arranged at a second detection pitch smaller than the first detection pitch among the detection elements included in the detection area,
the detector is configured to perform the detection in the fingerprint detection period in a partial detection area smaller than an area in which the detection is performed in the touch detection period,
the touch detection period comprises:
a first touch detection period of detecting whether the object to be detected in contact with or in proximity to the sensor circuit is present; and
a second touch detection period of detecting a position of the object to be detected in contact with or in proximity to the sensor circuit, and
the detector is configured to:
make a transition to the second touch detection period when the object to be detected in contact with or in proximity to the sensor circuit is detected in the first touch detection period; and
perform fingerprint detection using, as the partial detection area, a predetermined area that includes the position of the object to be detected in contact with or in proximity to the sensor circuit that has been detected in the second touch detection period.

9. The detection device according to claim 8, further comprising a light source configured to emit light to the detection area, wherein
the light source is configured to be lit up when the detector has detected the object to be detected in contact with or in proximity to the sensor circuit in the first touch detection period.

10. The detection device according to claim 9, wherein
the detector comprises a detection signal amplifying circuit configured to convert a variation of a current supplied from each of the detection elements through an output signal line into a variation of a voltage, and amplify the variation of the voltage, and
a constant-current source to conduct a bias current to the detection element through the output signal line is configured to be electrically decoupled in the first touch detection period.

11. The detection device according to claim 8, wherein the detector is configured to perform the detection in the first touch detection period using the detection elements, among the detection elements included in the detection area, the detection elements being arranged at a pitch larger than when performing the detection in the second touch detection period.

12. The detection device according to claim 8, wherein the first touch detection period is longer than the second touch detection period.

13. A display device comprising:
a sensor circuit in which a plurality of detection elements each comprising a photoelectric conversion element are arranged in a matrix having a row-column configuration in a detection area; and
a detector having a touch detection period of detecting an object to be detected in contact with or in proximity to the sensor circuit and a fingerprint detection period of detecting asperities on a surface of the object to be detected, wherein
the detector is configured to:
perform detection in the touch detection period by selecting the detection elements arranged on a substrate at a first detection pitch among the detection elements included in the detection area; and
perform the detection in the fingerprint detection period by selecting the detection elements arranged on the substrate at a second detection pitch smaller than the first detection pitch among the detection elements included in the detection area.

14. The display device according to claim 13, wherein the detector is configured to perform the detection in the fingerprint detection period in a partial detection area smaller than an area in which the detection is performed in the touch detection period.

15. The display device according to claim 14, wherein the detector is configured to make a transition to the fingerprint detection period when the object to be detected in contact with or in proximity to the sensor circuit is detected in the touch detection period.

16. The display device according to claim 15, wherein the detector is configured to set the partial detection area to a predetermined area that includes a position where the object to be detected in contact with or in proximity to the sensor circuit is detected in the touch detection period.

17. The display device according to claim 14, wherein the touch detection period is shorter than the fingerprint detection period.

18. The display device according to claim 14, wherein an exposure period of the touch detection period is shorter than an exposure period of the fingerprint detection period.

19. The display device according to claim 13, wherein each of the detection elements comprises:
   a reset transistor configured to apply a reset potential to a cathode of the photoelectric conversion element;
   a source follower transistor configured to output a signal corresponding to a potential generated by the photoelectric conversion element; and
   a read transistor configured to read an output signal of the source follower transistor.

20. A display device comprising:
   a sensor circuit in which a plurality of detection elements each comprising a photoelectric conversion element are arranged in a matrix having a row-column configuration in a detection area; and
   a detector having a touch detection period of detecting an object to be detected in contact with or in proximity to the sensor circuit and a fingerprint detection period of detecting asperities on a surface of the object to be detected, wherein
   the detector is configured to:
      perform detection in the touch detection period using the detection elements arranged at a first detection pitch among the detection elements included in the detection area; and
      perform the detection in the fingerprint detection period using the detection elements arranged at a second detection pitch smaller than the first detection pitch among the detection elements included in the detection area,
   the detector is configured to perform the detection in the fingerprint detection period in a partial detection area smaller than an area in which the detection is performed in the touch detection period,
   the touch detection period comprises:
      a first touch detection period of detecting whether the object to be detected in contact with or in proximity to the sensor circuit is present; and
      a second touch detection period of detecting a position of the object to be detected in contact with or in proximity to the sensor circuit, and
   the detector is configured to:
      make a transition to the second touch detection period when the object to be detected in contact with or in proximity to the sensor circuit is detected in the first touch detection period; and
      perform fingerprint detection using, as the partial detection area, a predetermined area that includes the position of the object to be detected in contact with or in proximity to the sensor circuit that has been detected in the second touch detection period.

21. The display device according to claim 20, further comprising a light source configured to emit light to the detection area, wherein
   the light source is configured to be lit up when the detector has detected the object to be detected in contact with or in proximity to the sensor circuit in the first touch detection period.

22. The display device according to claim 21, wherein
   the detector comprises a detection signal amplifying circuit configured to convert a variation of a current supplied from each of the detection elements through an output signal line into a variation of a voltage, and amplify the variation of the voltage, and
   a constant-current source to conduct a bias current to the detection element through the output signal line is configured to be electrically decoupled in the first touch detection period.

23. The display device according to claim 20, wherein the detector is configured to perform the detection in the first touch detection period using the detection elements, among the detection elements included in the detection area, the detection elements being arranged at a pitch larger than when performing the detection in the second touch detection period.

24. The display device according to claim 20, wherein the first touch detection period is longer than the second touch detection period.

* * * * *